United States Patent
Shand

(10) Patent No.: US 9,185,423 B2
(45) Date of Patent: *Nov. 10, 2015

(54) FRAME BUFFER COMPRESSION FOR VIDEO PROCESSING DEVICES

(75) Inventor: Mark Shand, Dampierre en Yvelines (FR)

(73) Assignee: ZORAN (FRANCE) S.A., Beuilly-sur-Seine (FR)

( * ) Notice: Subject to any disclaimer, the term of this patent is extended or adjusted under 35 U.S.C. 154(b) by 770 days.

This patent is subject to a terminal disclaimer.

(21) Appl. No.: 13/148,866

(22) PCT Filed: Jan. 22, 2010

(86) PCT No.: PCT/EP2010/050722
§ 371 (c)(1),
(2), (4) Date: Aug. 10, 2011

(87) PCT Pub. No.: WO2010/091930
PCT Pub. Date: Aug. 19, 2010

(65) Prior Publication Data
US 2011/0310974 A1   Dec. 22, 2011

Related U.S. Application Data

(60) Provisional application No. 61/152,127, filed on Feb. 12, 2009.

(51) Int. Cl.
*H04N 7/30* (2006.01)
*H04N 19/426* (2014.01)
(Continued)

(52) U.S. Cl.
CPC ........... *H04N 19/428* (2013.01); *H04N 19/124* (2013.01); *H04N 19/136* (2013.01);
(Continued)

(58) Field of Classification Search
CPC ............. H04N 7/12; H04N 7/30; H04N 7/26; G06K 9/46; G04K 9/46; G04K 9/36
USPC ........... 375/240.18–240.25, 240.19; 382/240, 382/248, 233, 244
See application file for complete search history.

(56) References Cited

U.S. PATENT DOCUMENTS 5,901,178 A * 5/1999 Lee et al. ........................ 375/240
6,332,043 B1 * 12/2001 Ogata ........................... 382/240
(Continued)

FOREIGN PATENT DOCUMENTS

EP    1566969 A1    8/2005
GB    2264609 A     9/1993
(Continued)

OTHER PUBLICATIONS
Notification of Transmittal of the International Search Report and the Written Opinion of the International Searching Authority dated Dec. 30, 2011 for corresponding Application No. PCT/EP2010/050722.
(Continued)

*Primary Examiner* — Dave Czekaj
*Assistant Examiner* — Dramos I Kalapodas

(57) ABSTRACT

For compressing a video signal, a local multiscale transform is applied to a frame of the video signal to obtain coefficient blocks. The coefficients of each block are distributed into coefficient groups associated with that block. A plurality of the coefficient groups associated with a block are processed. The processing of one of the groups comprises determining an exponent for encoding the coefficients of that group. Mantissas are determined for quantizing the coefficients of the plurality of groups in combination with the exponents respectively determined for these groups. Coding data including each exponent determined for a coefficient group and the mantissas quantizing the coefficients of the group in combination with this exponent are stored in an external frame buffer. The mantissas determined for quantizing the coefficients of one of the groups are represented in the coding data by a respective number of bits depending on the exponents determined for the plurality of coefficient groups.

15 Claims, 9 Drawing Sheets

(51) Int. Cl.
*H04N 19/64* (2014.01)
*H04N 19/63* (2014.01)
*H04N 19/124* (2014.01)
*H04N 19/136* (2014.01)
*H04N 19/186* (2014.01)
*H04N 19/18* (2014.01)
*H04N 19/184* (2014.01)
*H04N 19/645* (2014.01)
*H04N 19/33* (2014.01)
*H04N 7/26* (2006.01)

(52) U.S. Cl.
CPC ............ *H04N 19/18* (2013.01); *H04N 19/184* (2013.01); *H04N 19/186* (2013.01); *H04N 19/33* (2013.01); *H04N 19/63* (2013.01); *H04N 19/645* (2013.01); *H04N 19/647* (2013.01)

(56) References Cited

U.S. PATENT DOCUMENTS

| | | | |
|---|---|---|---|
| 6,621,865 B1 | 9/2003 | Yu | |
| 6,785,423 B1 | 8/2004 | Joshi et al. | |
| 7,068,849 B2* | 6/2006 | Zandi et al. | 382/240 |
| 7,167,592 B2* | 1/2007 | Zandi et al. | 382/240 |
| 7,215,820 B2* | 5/2007 | Zandi et al. | 382/240 |
| 7,315,651 B2 | 1/2008 | Sakuyama et al. | |
| 7,418,142 B2* | 8/2008 | Zandi et al. | 382/232 |
| 7,889,103 B2* | 2/2011 | Mittal et al. | 341/107 |
| 2001/0036231 A1 | 11/2001 | Easwar et al. | |
| 2005/0111740 A1* | 5/2005 | Sakuyama | 382/232 |
| 2006/0071825 A1* | 4/2006 | Demos | 341/50 |
| 2006/0133675 A1 | 6/2006 | Kuo | |
| 2007/0110151 A1 | 5/2007 | Yu et al. | |
| 2010/0220783 A1* | 9/2010 | Mallat et al. | 375/240.03 |
| 2011/0310974 A1 | 12/2011 | Shand | |

FOREIGN PATENT DOCUMENTS

| | | |
|---|---|---|
| WO | 2006008681 A1 | 1/2006 |
| WO | 2006090334 A2 | 8/2006 |
| WO | 2007080939 A1 | 7/2007 |
| WO | 2009053780 A2 | 4/2009 |

OTHER PUBLICATIONS

Kim et al., "Motion-adaptive alternate gamma drive for flicker-free motion-blur reduction," Journal of SID 17/3, 2009, pp. 203-212.

Buckley, JPEG 2000—A Practical Digital Preservation Standard, Xerox Research Center, Webster, New York, USA, Feb. 2008.

Shih et al., "Memory Reduction by Haar Wavelet Transform for MPEG Decoder", IEEE Transactions on Consumer Electronics, vol. 45, No. 3, Aug. 1, 1999, pp. 867-873.

* cited by examiner

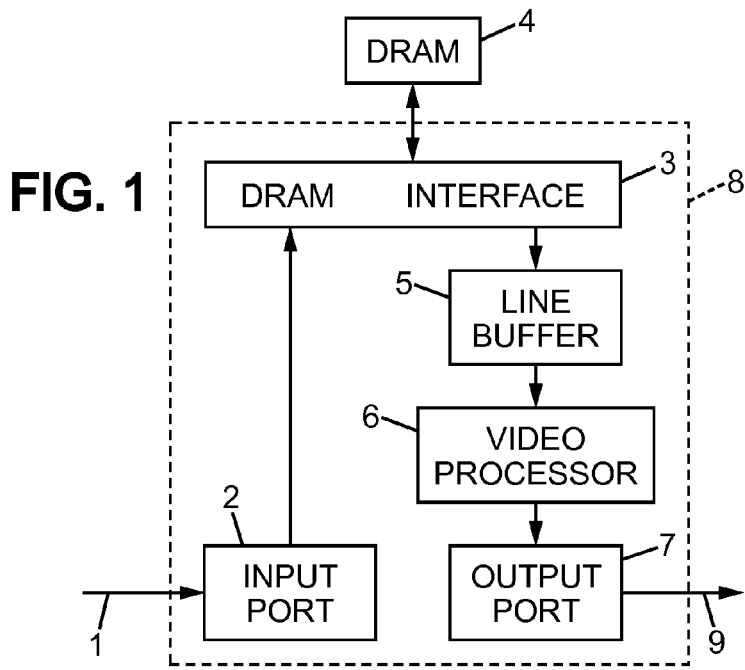
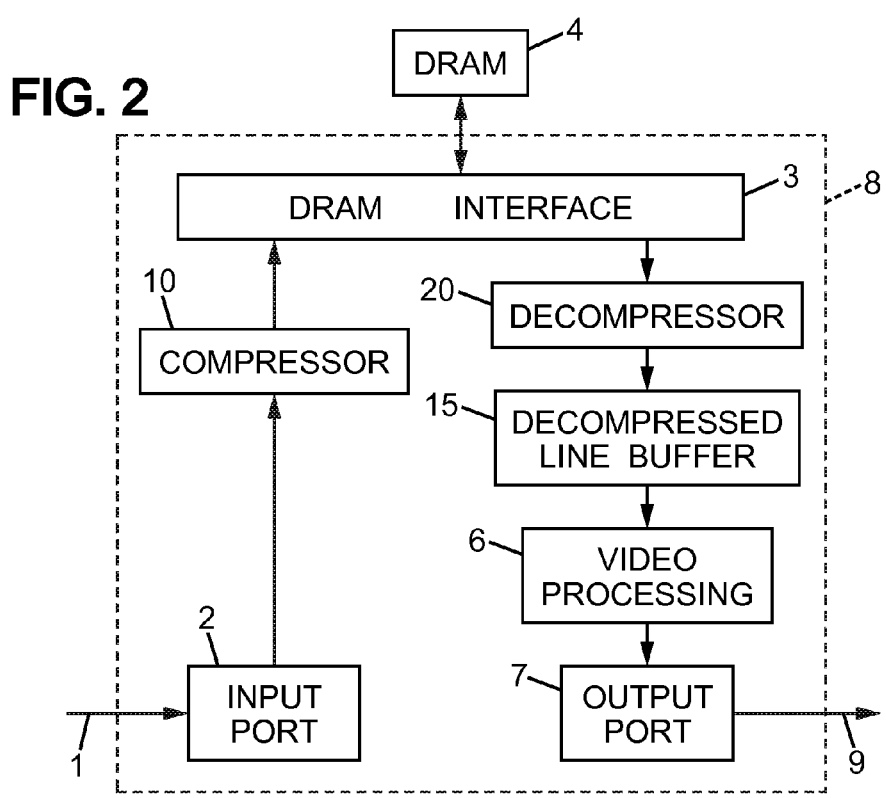

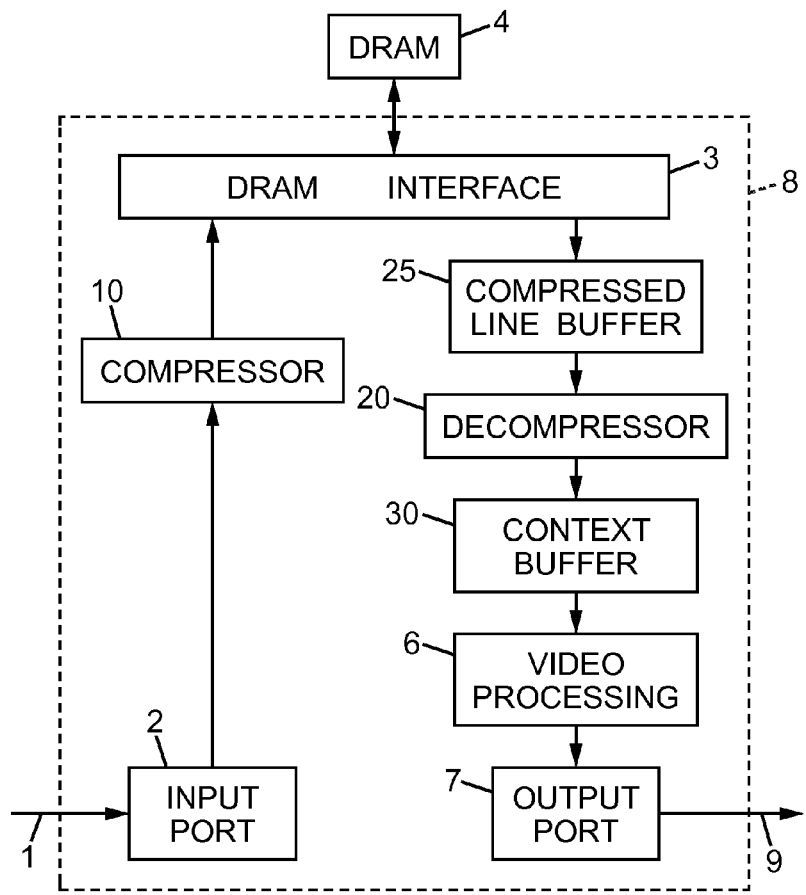
FIG. 3
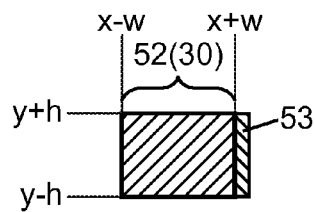
FIG. 4
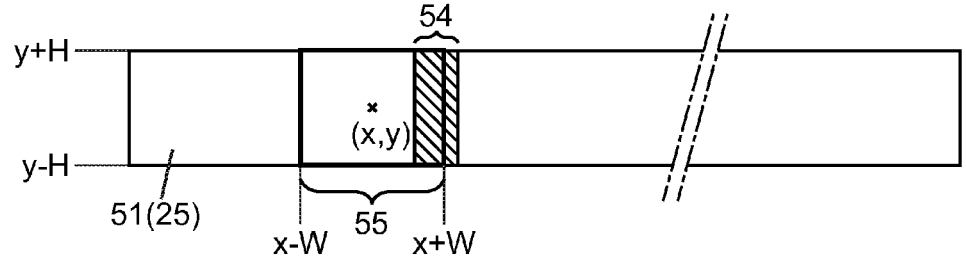

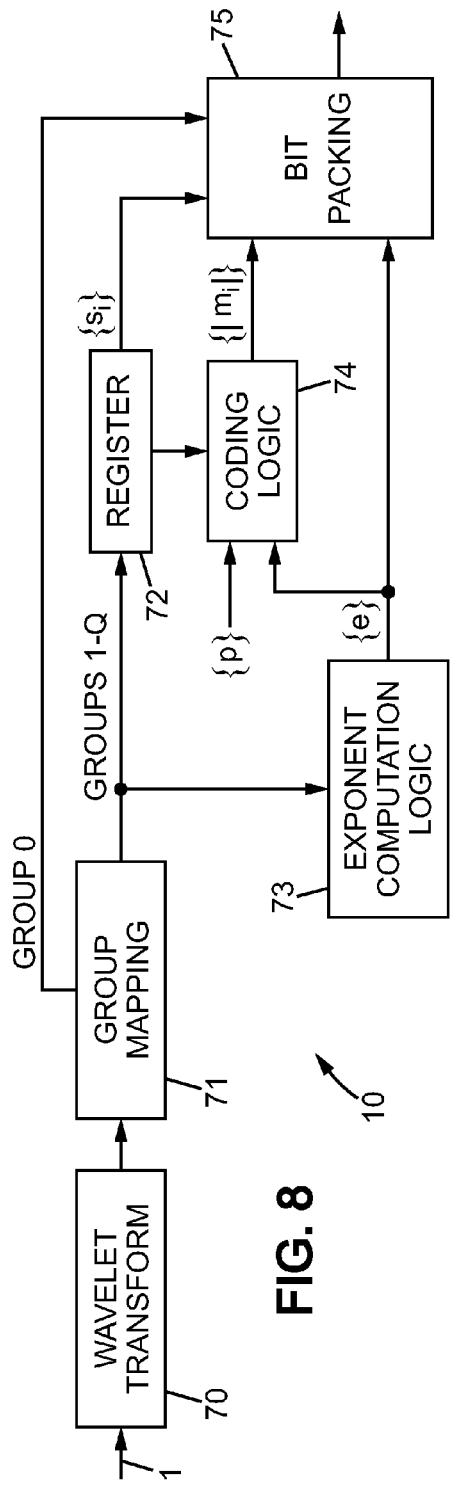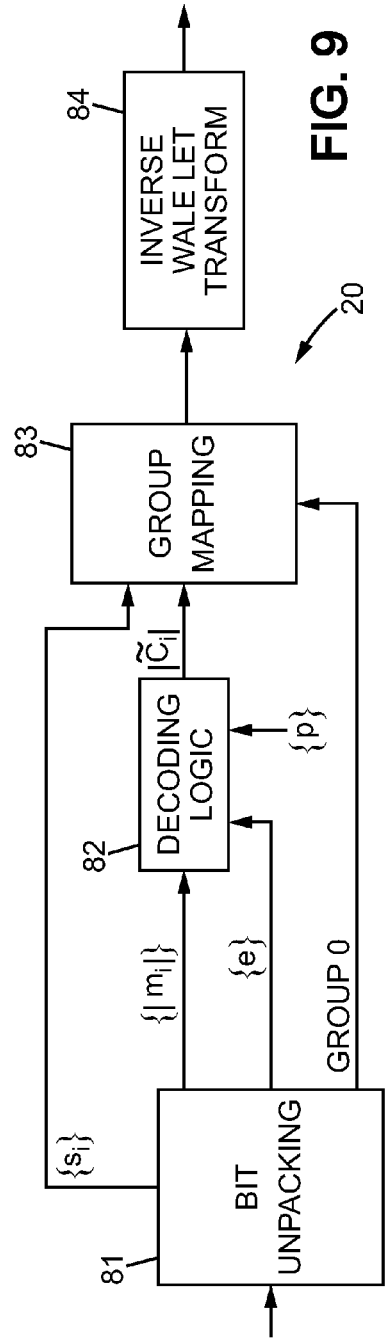
FIG. 8
FIG. 9

FRAME BUFFER COMPRESSION FOR VIDEO PROCESSING DEVICES

BACKGROUND OF THE INVENTION

The present invention relates to video processing and in particular to real-time video processing in dedicated hardware devices.

In the design of such dedicated hardware video processing devices, it is generally desired to reduce the need for external memory components, and for internal memory.

In a video processing device embodied as an application-specific integrated circuit (ASIC) or a field-programmable gate array (FPGA), input frames are stored in a frame buffer usually located in external memory, because it does not fit in the device itself. For processing, several frames are loaded line by line to be stored in an internal memory of the device, called line buffer.

FIG. 1 shows the typical data flow and storage involved in a conventional video processing device 8. The input pixels 1 received at an input port 2 are stored into a frame buffer 4, usually implemented as one or more dynamic random access memory (DRAM) chips, via a DRAM interface 3. Then, the video processor 6 fetches lines from the DRAM 4 through the DRAM interface 3, storing them temporarily in the line buffer 5. The output 9 of processor 6 is fed to the output port 7 to be transmitted to the next device to which the video processing device 8 is connected. All image transfers are done in raster order, i.e. each frame full line by full line, and each line of a frame pixel by pixel from left to right.

In such a device 8, using an external DRAM 4 is required if the video processor 6 needs to process simultaneously pixels originating from different frames. This is necessary, for example, in applications such as deinterlacing, frame rate conversion, and overdrive processing in LCD timing controllers.

If the video processor 6 also needs to have access to pixels of different lines at the same time, a line buffer 5 of substantial size needs to be present inside the device 8. Important design parameters include the size of the DRAM 4, the available bandwidth between the device 8 and the DRAM chip(s) 4, and the size of the line buffer 5.

Considering input video frames of Y lines of X pixels each, with an input frame rate of F, the input pixel rate is $X \times Y \times F$ not taking into account blanking. Typical values are X=1920, Y=1080 and F=50 or 60 FPS (frames per second). Similar parameters X', Y' and F' describe the output frame size and frame rate. In order to output one pixel, the video processor 6 needs to have simultaneous access to a context of C lines of the input video frames, for N different video frames. The DRAM 4 must then be able to store at least N frames of video, i.e. a total of $X \times Y \times N$ pixels. At the DRAM interface, the pixel rate is $X \times Y \times F$ pixels per second for writing and $X \times Y \times N \times F'$ pixels per second for reading. Typical data rates are then 1 billion pixels per second, which amounts to 30 Gb/s if a pixel is represented in RGB with 10 bits per channel. High transfer rates between the device 8 and the DRAM 4 are not desirable because they may require using a higher number of DRAM chips in parallel. The video processing device (in the case of an ASIC) then needs to have a large number of pins to access all the DRAM chips.

The required size of the internal video buffer 5 is $X \times C \times N$ pixels. Hosting such a large line buffer in an ASIC is expensive, because it increases the die size of the ASIC, and has a negative impact on the manufacturing yield. It is thus desirable to limit as much as possible the size of the line buffer.

Compression techniques are a way of reducing both the required size of the internal memory and the bandwidth to the external DRAM chip(s). One way of using compression to this end is illustrated in FIG. 2. Between the input port 2 and the DRAM interface 3, an encoder 10 compresses the input pixel sequence for storage into DRAM 4. For operating the video processor 6, a decoder 20 receives the compressed pixel data read from DRAM 4 to restore decompressed pixel lines written into the decompressed line buffer 15 which may contain several adjacent lines forming a stripe. The video processor 6 reads pixel values from the decompressed line buffer 15, and delivers outputs pixels 9 via the output port 7.

The bandwidth to or from the external DRAM chip(s) is divided by the compression factor provided by the compression. The number/size of external DRAM chip(s) can be reduced in the same factor. Applying compression in such a context is disclosed in US 2007/0110151 A1, where a differential pulse code modulation (DPCM) scheme is used for compression.

In certain known compression techniques, the RGB pixels are converted to a YUV color space, and the color channels U are V and low-pass filtered and down-sampled by a factor of 2 horizontally. The frame is then stored in what is commonly called YUV 422 format. Other color sub-sampling schemes exist, like YUV 420 or YUV 411. Recovering the RGB pixels requires to first up-sample again the U and V color planes, and to do the color space conversion from YUV back to RGB. In this way, the color information is simply down-sampled. For certain kinds of contents, such as video games, reducing the color resolution introduces visible artifacts. Such compression schemes allow compression factors of 1.5:1, or 2:1 in the very best case.

More efficient compression schemes such as JPEG or JPEG-2000 are widely known. They offer a visual quality close to lossless with compression factor of 3 to 5. They are not well adapted though, because in most cases random access to an image region is not possible without decompressing the entire image. Also, it is desirable that the frame buffer compression process provides a constant bit rate (CBR) reduction factor in order to ensure that the peak bit rate for transmitting the frame buffers at a constant pixel rate is controlled.

There is a need for a new way of compressing videos to deal with frame and line buffer constraints in video processing devices while minimizing the impact of compression on the quality of the images being processed. There is also a need for a compression scheme usable in such a context, which provides a good tradeoff between compression ratio and image quality.

SUMMARY OF THE INVENTION

A method of compressing a video signal is proposed, comprising:
applying a local multiscale transform to a frame of the video signal to obtain coefficient blocks;
distributing the coefficients of each block into coefficient groups associated with said block;
processing a plurality of the coefficient groups associated with a block, wherein the processing of one of the groups comprises determining an exponent for encoding the coefficients of said one of the groups, and wherein the processing of the plurality of coefficient groups comprises determining mantissas for quantizing the coefficients of the plurality of groups in combination with the exponents respectively determined for said groups;

storing coding data including each exponent determined for a coefficient group and the mantissas quantizing the coefficients of said group in combination with said exponent.

In the proposed method, the mantissas determined for quantizing the coefficients of one of the groups are represented in the coding data by a respective number of bits depending on the exponents respectively determined for the plurality of coefficient groups.

The image coefficients are grouped into relatively small blocks of coefficients (e.g. 4×4, 8×8 or 8×2 coefficients). A coefficient block corresponds to a small region of the frame (e.g. 4×4, 8×8 or 8×2 pixels). This allows performing a direct memory access to a compressed frame buffer with minimal overhead. Each coefficient group can be made up of coefficients resulting from the local multiscale transform at a same scale.

Groups of multiscale (e.g. wavelet) coefficients are represented with a common exponent, shared with all coefficients within the group, and individual signed mantissas. The multiscale coefficients can generally be positive or negative. The mantissas determined for each coefficient can be seen as positive numbers, in which case there are associated with a sign bit, or as signed numbers. Using an exponent, a sign and a mantissa for a single coefficient is a principle used in floating point representations of numbers in computers.

In an embodiment, a preset number of coding data bits is allocated to all the mantissas determined for the plurality of coefficient groups pertaining to a block, and the preset number of coding data bits are distributed among the coefficient groups as a function of the exponents respectively determined for said coefficient groups. The number of bits for representing the mantissas of a coefficient group is typically an increasing function of the exponent determined for that group.

An interesting variant makes use of priority indexes respectively assigned to the plurality of coefficient groups associated with a coefficient block. The mantissas determined for one of the groups can then be represented in the coding data by a respective number of bits depending on the exponents determined for the plurality of coefficient groups and on the priority indexes assigned to the plurality of coefficient groups. For example, the priority index may be zero for at least one first coefficient group and a positive integer for at least one second coefficient group. The distribution of the preset number of coding data bits among the coefficient groups can be designed such that the number of bits representing the mantissas determined for one of the coefficient groups in the coding data is an increasing function of the sum of the exponent determined for said one of the coefficient groups and the priority index assigned to said one of the coefficient groups.

In an embodiment, the plurality of coefficient groups include first groups having the same number of coefficients and at least one second group having fewer coefficients than said first groups, and the method comprises rearranging the coefficients of the second group by a bit permutation into a rearranged group of M modified coefficients, where M is the number of coefficients in said first groups, and increasing the priority index of the rearranged group as compared to the second group to account for a reduction of the number of bits per coefficient resulting from the permutation.

As a complement to the above compression method, there is provided a method of decompressing a video signal from coding data which include, for a frame of the video signal, block data for respective coefficient blocks corresponding to respective regions of the frame in a local multiscale transform, each block comprising a plurality of coefficient groups.

The block data for each coefficient block include exponents respectively associated with at least some of the coefficient groups of said block and mantissas associated with the coefficients of said at least some of the coefficient groups. The decompression method comprises, for at least one coefficient block:

reading in the block data the exponents associated with said coefficient groups;

obtaining from the block data the mantissas associated with the coefficients of said coefficient groups in accordance with a distribution of coding data bits determined as a function of the read exponents;

recovering approximated values of the coefficients of each of said coefficient groups by combining the mantissas associated with said coefficients and the exponent associated with said coefficient group;

assembling said coefficient block using the approximated coefficient values; and applying a local inverse multiscale transform to the assembled coefficient block.

Other aspects of the invention relate to an encoder and a decoder arranged for implementing the above compression and decompression methods. Such encoder and decoder can in particular have application in video processing devices.

Such a video processing device according to the invention comprises:

an encoder for compressing a video signal in the form of coding data for successive frames of the video signal, a memory interface for storing the coding data in an external memory and retrieving coding data from the external memory;

a decoder for converting retrieved coding data into a decompressed signal; and a video processor for processing the decompressed signal.

The encoder comprises:

a transforming unit for applying a local multiscale transform to a frame of the video signal to obtain coefficient blocks;

a mapping unit for distributing the coefficients of each block into coefficient groups associated with said block; and a coding data generator for generating coding data from a plurality of the coefficient groups associated with a block, wherein the coding data include, for one of the groups:

an exponent for encoding the coefficients of said one of the groups; and mantissas for quantizing the coefficients of said one of the groups in combination with the exponent determined for said one of the groups, the mantissas determined for one of the groups being represented in the coding data by a respective number of bits depending on the exponents determined for said plurality of coefficient groups.

The decoder comprises:

an extraction unit for obtaining block data for at least one coefficient block, the block data including the exponents associated with said coefficient groups and the mantissas associated with the coefficients of said coefficient groups, the mantissas being obtained in accordance with a distribution of coding data bits determined as a function of the exponents associated with said coefficient groups;

decoding logic for obtaining approximated values of the coefficients of each of said coefficient groups by combining the mantissas associated with said coefficients and the exponent associated with said coefficient group;

an assembling unit for assembling said coefficient block using the approximated coefficient values; and a transforming unit for applying a local inverse multiscale transform to the assembled coefficient block.

According to another aspect of the invention, there is provided a video compression method, comprising: filtering and downscaling a first video signal to obtain a second signal; computing a third signal as a difference between the first signal and an upscaled replica of the second signal; encoding the third signal to obtain a quantized version of the third signal; and outputting a quantized version of the second signal and the quantized version of the third signal.

Based on the quantized version of the second signal, the corresponding decoder is then able to obtain a low-definition version of the original video signal with has been appropriately filtered, in particular to avoid aliasing artifacts. If a full-definition version of the original video signal, the quantized version of the third signal can be used as a refinement. The encoding of the third signal is preferably implemented in accordance with the above-mentioned method using an exponent-mantissa representation.

A video encoder is also proposed, comprising: a filtering and downscaling unit for transforming a first video signal into a second signal; a first encoder processing the second signal to obtain a quantized version of the second signal; a decoder processing the quantized version of the second signal to obtain a replica of the second signal; an upscaler receiving the replica of the second signal; a subtractor for computing a third signal as a difference between the first signal and the upscaled replica of the second signal; and a second encoder processing the third signal to obtain a quantized version of the third signal. The output of the video encoder includes the quantized versions of the second and third signals.

In another embodiment of the video processing device, the video encoder is as mentioned in the preceding paragraph and the decoder comprises: a first decoder receiving the quantized version of the second signal and operating like the decoder of the video encoder to obtain the replica of the second signal; a second decoder receiving the quantized version of the third signal to obtain a replica of the third signal; an upscaler receiving the replica of the second signal; and an adder receiving the replicas of the second and third signals.

BRIEF DESCRIPTION OF THE DRAWINGS

FIGS. 1-2, discussed above, are block diagrams of video processing devices.

FIG. 3 is a block diagram of another embodiment of a video processing device.

FIG. 4 is a diagram illustrating a way of organizing line and context buffers in an embodiment of the invention.

FIGS. 8 and 9 are block diagrams of exemplary encoder and decoder according to the invention.

DESCRIPTION OF PREFERRED EMBODIMENTS

Figure 5:
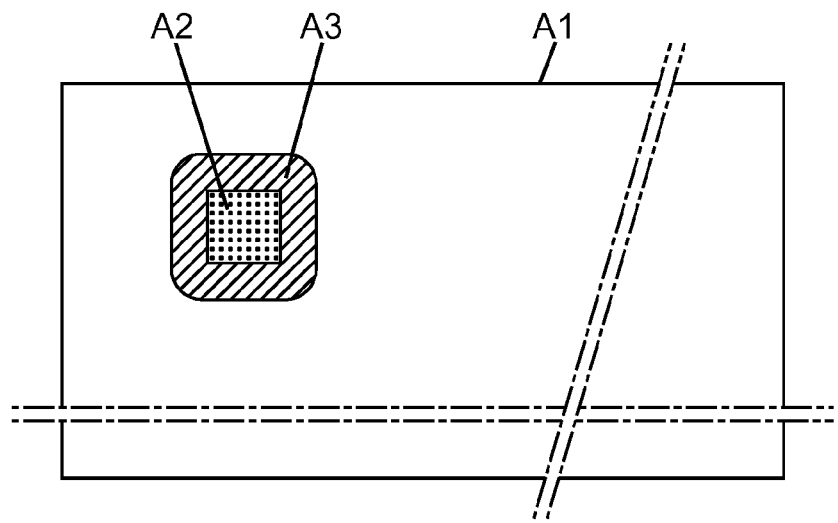
FIGS. 5 and 6 are diagrams illustrating the correspondence between pixel regions in a video frame and coefficient blocks resulting from an exemplary local multiscale transform.

Compression can be used for reducing the need for internal memory inside a video processing device 8 which may have, for example the structure shown in FIG. 2 or 3.

In the embodiment of FIG. 3, the line information is transferred in a compressed form from the DRAM 4 to be stored into a compressed line buffer 25 whose size, compared to the decompressed line buffer 15 of FIG. 2, is reduced by the compression factor. The decoder 20 decompresses on-the-fly pixels from the line buffer 25 to store decompressed pixels in a small-sized context buffer 30.

On-the-fly decompression of the context portion is performed as the video processor 6 is proceeding along a line of the current output frame. FIG. 4 illustrates the operation of decoder 20 in the video processing device 8 of FIG. 3. The compressed line buffer 25 contains coding data corresponding to a horizontal stripe 51 of pixels. As an example, the uncompressed pixels are each made of 30 bits in RGB representation and the compression factor is 2:1, so that the number of bits per pixel in the compressed state is 15.

The video processor 6 runs along the pixel frames in raster order. At a given point, it is processing a pixel of coordinates (x, y). Stripe 51 covers pixels useful for processing all pixels of coordinates (x', y) where x' covers the width of the image. When processing pixel (x, y), the video processor 6 needs access to a context of decompressed pixels 52. In the example considered here, the context portion is a rectangle [x−w; x+w]×[y−h; y+h], where w and h are the half-width and the half-height of the context. The decompressed pixels of the context portion 52 are maintained in a separate storage area, namely the context buffer 30. The decompressed pixel context is much narrower than the full line buffer. It is computed from a corresponding compressed context 55 which is part of the stripe 51 stored in the line buffer 25. In the example, the context of compressed pixels 55 is a rectangle [x−W; x+W]× [y−H; y+H], with W≥w and H≥h. So the height of stripe 51 must be sufficient to include 2H lines. When turning to the next pixel to be processed, at (x+1, y), the context of decompressed pixels 52 is updated as follows: the leftmost column is dropped, and an additional column 53 of new decompressed pixels is computed at added as the new rightmost column of the context portion. This column of pixels 53 can be derived from a small set of compressed pixel coefficients located at 54 in the stripe 51 stored in line buffer 25. Depending on the needs of the video processing architecture using the context of decompressed pixels 52, the shape of the context may differ from the above simple example. It may be not centered around the current pixel, but more generally offset in accordance with the pixel location x, y. For example it can be a rectangle [x−w; x+w']×[y−h; y+h']. It may be of non-rectangular shape, or even non-connected (e.g. several distinct rectangles). In the case of non-rectangular shapes, the context of decompressed pixels 52 may be updated by dropping one or more columns of pixels and adding also one or more columns of decompressed pixels. For simplicity of the description however, the simpler case of a centered rectangular context is exemplified in the drawings.

The device shown in FIG. 2 or 3 can make use of the compression/decompression scheme described below.

In the first step of the compression process, the encoder 10 applies a multiscale transform to the pixels of the current frame. In the following, this multiscale transform is a wavelet transform. A low-complexity transform such as a Haar or 5-3 Daubechies wavelet transform can in particular be used. The transform is performed with a predefined number of scales. The transform is assumed to map integers to integers and is performed in-place using lifting steps.

Through the multiscale wavelet transform, a correspondence is established between regions of a current frame and blocks of transform coefficients. The correspondence may be one-to-one between image regions and coefficient blocks. Other block mapping rules can also be applied.

Figure 6:
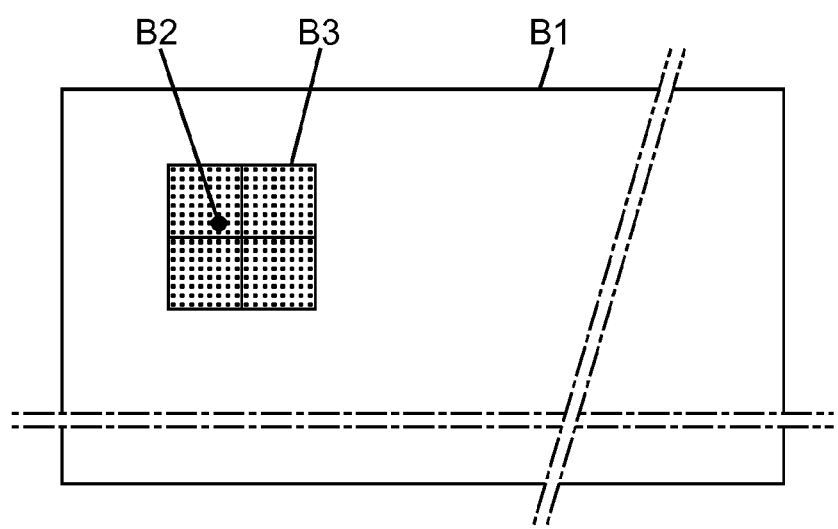

For example, in the above-mentioned case of a wavelet transform performed in-place, the correspondence may be as illustrated in FIGS. 5-6. In FIG. 5, A1 denotes an image made of pixels I[x, y] where the integer indices x and y are in the intervals $0 \leq x < X$ and $0 \leq y < Y$. The transform is conventionally arranged so that the transform of the whole image contains the same number of coefficients as the number of pixels in the image, and that the transform coefficients are indexed in the same way. The transform coefficients C[x, y] are then defined for the same values of x and y. In addition, the transform is local in the sense that a block A2 of coefficients C[x, y] for $p \times 2^N \leq x < (p+1) \times 2^N$ and $q \times 2^N \leq y < (q+1) \times 2^N$ can be computed from pixels with the same indices, and pixels located in a vicinity depicted by the hatched area A3. In the example illustrated in FIGS. 5-6, N=3, the blocks being made of 8×8=64 coefficients. So in this case, coefficient block A2 corresponds to region A2∪A3 in the image.

FIG. 6 represents the array of transform coefficients B1, having the same size as the original image array. The inverse transform is also local, in the sense that, in order to compute a pixel value at x, y (depicted by the black dot B2), a limited number coefficient blocks located around this pixel (B3) are needed to perform the reconstruction of the pixel value. These blocks (B3) are those corresponding to the image regions including pixel B2.

Many video processing applications do not need a random access with a granularity of a single pixel, but of a cluster of pixels, or a cluster of pixels moving in raster order, reconstructed with a pipelined wavelet reconstruction, so that the apparently poor ratio (volume of data needed to reconstruct a single pixel value) is in practice much more favorable.

Figure 7:
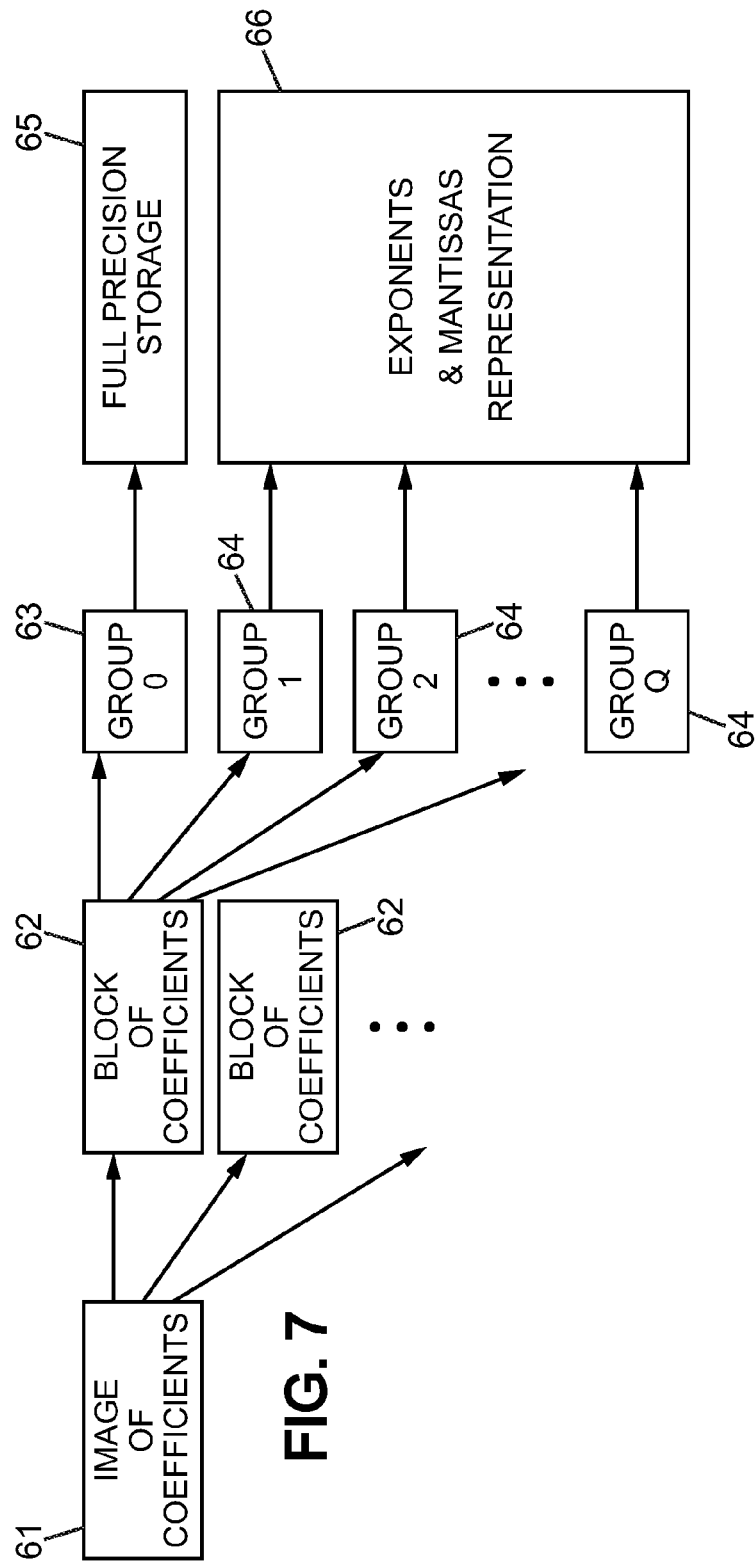
FIG. 7 is a diagram illustrating a way of distributing and representing multiscale image coefficients in an embodiment of the invention.

FIG. 7 illustrates a mapping scheme applied to the transform coefficients. The coefficients 61 resulting from the multiscale transform form an image that is split into several blocks of coefficients 62, each corresponding to a small region of the current frame. Each block of coefficients 62 is coded with a predefined number of bits as follows. A block of coefficients 62 is split into several groups of coefficients 63, 64, etc. Usually, all coefficients within a given group have the same nature (same type of coefficient, same dynamic range). For each block 62, a special group 63 is the one containing the low-pass coefficient of the multiscale transform. This low-pass coefficient can be represented and stored with full precision 65. The Q other coefficient groups 64 (Q≥2) are quantized to form an exponents and mantissas representation 66 described further below.

A possible structure of the encoder 10 is illustrated in FIG. 8. The frames received from the input port 2 are provided to a transforming unit 70, in this case a wavelet transform unit, which processes them in the raster order to generate the multiscale coefficients mapped onto groups of coefficients by a unit 71 as outlined above. The mapping unit 71 extracts the low-pass coefficient of group 63 (0) and supplies the coefficients of the other groups 64 (1–Q) to a register 72 belonging to a coding data generator 72-75.

For each coefficient group 64, a common exponent representation is built. Namely each coefficient $c_i$ of a group 64 is approximated as:

$$c_i \approx 2^e \cdot m_i \quad (1)$$

where e is an exponent common for the coefficients within the group 64, and the numbers $m_i$ designate respective mantissas for the coefficients $c_i$.

A logic module 73 computes a respective exponent e from the coefficients of each group 64, as received from the mapping unit 71. Based on the Q exponents e for the different groups 64, an adaptive quantization is applied to the absolute values of the coefficients $c_i$ of the Q groups of the current block by the coding logic 74 to compute the absolute values of the mantissas $m_i$. The mantissas $m_i$ (with their sign bits $s_i$ read from register 72) and the exponents e for the whole block 62 are then assembled together in a bit packing unit 75 to produce a compressed data unit of predetermined size. This data unit also includes the full precision representation of the low-pass coefficient of the multiscale transform (group 63).

The structure of the corresponding decoder 20 is illustrated in FIG. 9. The compressed data units are extracted by a bit unpacking unit 81 which recovers the absolute values of the mantissas $m_i$ and the exponent e for each group. These are used to "dequantize" the absolute values of reconstructed coefficients $\tilde{c}_i$ with a formula identical or similar to (1) in decoding logic 82. The reconstructed coefficients $\tilde{c}_i$ with their sign bits $s_i$ provided by the bit unpacking unit 81 are assembled into reconstructed coefficient blocks and into images of reconstructed coefficients by the group mapping unit 83 which also receives the low-pass coefficient of group 63. The decompressed image portion is then computed by the transforming unit 84 by applying the inverse wavelet transform to the reconstructed coefficients.

In an exemplary embodiment, the exponent e for a group is computed by the logic module 73 as follows. The absolute value of each coefficient $c_i$ of the group is written in binary form. Then the exponent e is defined as an integer related to the rank r of the highest order non-zero bit in all absolute values $|c_i|$. For example, we can take e=r+1. The exponent e for the group is then the number of bits needed to store a full precision representation of the largest absolute value among the coefficients of the group, and $|m_i| \leq 1$ in (1).

Figure 10:
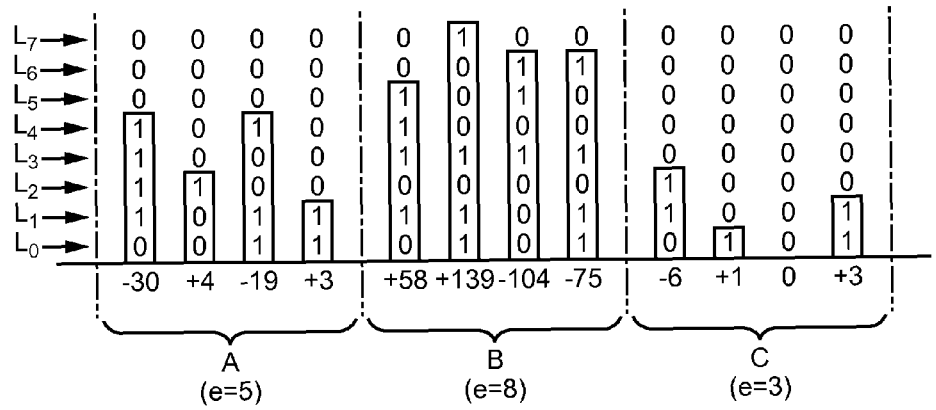
FIG. 10 shows a bit array representing a simplified coefficient block resulting from a local multiscale transform.

A simplified example where a coefficient block is made of three groups A={−30, +4, −19, +3}, B={+58, +139, −104, −75} and C={−6, +1, 0, +3} is depicted in FIG. 10. The bits forming the binary representations of the absolute values of the coefficients $c_i$ are indicated in columns, with the most significant bit at 1 in the highest position followed by the other bits in the order of decreasing significance. The rows in the array form bit layers $L_j$ made of bits weighted by $2^j$ in the binary representation of coefficients (j=0, 1, 2, . . . , jmax where jmax defines the maximum size of the coefficients; for example jmax=7 for integer coefficients in the range [−256, 255]). In the example, the global exponent is e=5 for group A, e=8 for group B and e=3 for group C. Above the column representing a coefficient $c_i$, zeros are indicated as non-significant bits in FIG. 10 up to layer $L_{jmax}$. The sign bits $s_i$ are not represented in the bit array.

In a hardware implementation, the exponent e for a coefficient group can be readily obtained by a module 73 consisting of a set of logical OR gates determining the rank j of the most significant non-zero bit of all coefficients in the group.

Figure 11:
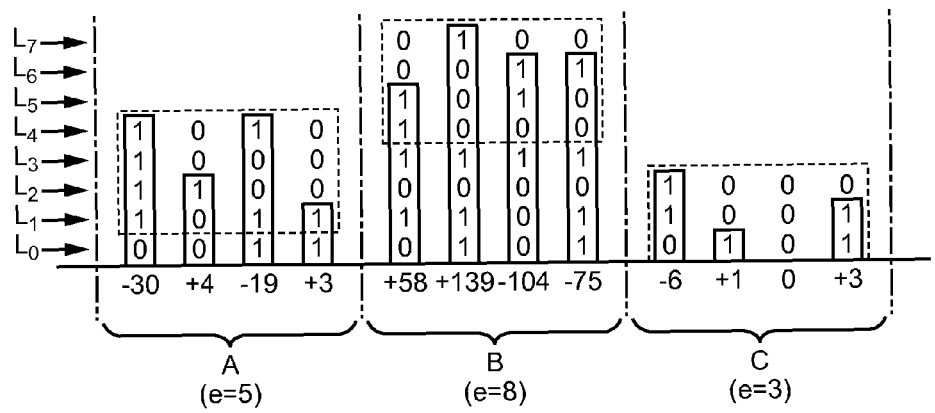
FIG. 11 is a diagram illustrating a way of encoding mantissas from the bit array of FIG. 10.

FIG. 11 illustrates a way of quantizing the coefficients by mantissas all represented by the same number of bits d (d=4 in the illustration). Since the exponent e is common for all the coefficients of a given group, the absolute value of each coefficient $c_i$ in the group is represented with a uniform quantizer of bin size $2^{e-d}$, i.e.: $2^d \times m_i = \lfloor c_i/2^{e-d} \rfloor$ if $c_i > 0$ and $2^d \times m_i = -\lfloor -c_i/2^{e-d} \rfloor$ else, where $\lfloor X \rfloor$ denotes the integer equal to or immediately below X. The bits of each coefficient indicated by the dashed lines in FIG. 11 are then included in the coding data for the mantissas. The same relative precision is ensured in each of the groups. However, if a group is made of coefficients of low value, it is assigned the same bit rate as a group having much stronger coefficients, which may not an efficient use of the available bandwidth. For example, the bits of layer 3 from group B in FIG. 11, weighted by $2^3$, are not part of the encoded bit stream while all the bits representing the lower coefficients of group C are included. Also, if e<d (like for group C), some of the coding data bits are not used.

It is more appropriate to assign to each coefficient group a number of bits for representing the mantissas which depends on the exponent e determined for that group. In general, the number of representative bits will be an increasing function of the exponent, or at least a non-decreasing function.

Typically, there will be a fixed number K of bits allocated to the absolute values of the mantissas of a coefficient block in the output bit stream. Thus the different groups of the block compete for the fixed budget of K bits and the number of bits representing the mantissas of a group depends on the exponent determined for that group but also on the exponents determined for the other groups of the block. In the illustrative example of FIG. 12, K=48 (like in FIG. 11). Group B has the largest exponent (e=8) and is thus assigned the largest number of bits for representing the absolute values of the mantissas (7). Group A has the second largest exponent (e=5) and is assigned the second largest number of bits for representing the absolute values of the mantissas (4). Group C has the smallest exponent (e=3) and is assigned the second largest number of bits for representing the absolute values of the mantissas (1).

Figure 12:
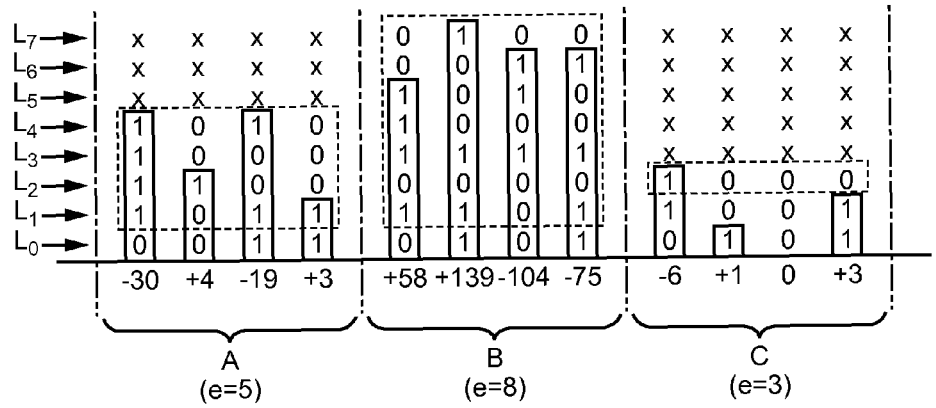
FIG. 12 is a diagram illustrating an alternative way of encoding mantissas from the bit array of FIG. 10 in accordance with an embodiment of the invention.

The number of bits per mantissa in the different groups can be determined with reference to the bit array representation shown in FIG. 12. The bit layers $L_j$ are scanned in the decreasing order of bit ranks j starting from the rank j corresponding to the largest of the exponents e determined for the different groups ($L_7$ in FIG. 12). Each layer $L_j$ is scanned according to a predetermined order of the coefficients in the block, for example from left to right in FIG. 12. Every coefficient belonging to a group associated with an exponent at least equal to the rank j corresponding to the layer $L_j$ being scanned in the array provides a bit which is inserted into the output bit stream. Once layer $L_j$ is completely scanned, the algorithm applies the same processing to layer $L_{j-1}$ situated immediately below in the bit array, and so forth until the budget of K bits for the block is exhausted. In the example, the bits indicated by the dashed lines in FIG. 12 are included in the coding data for the absolute values of the mantissas.

It can be observed that the use of the limited bit budget is more efficient in the case of FIG. 12 than in the case of FIG. 11, since the weights $2^j$ of the bits included in the bit stream are generally higher.

Figure 13:
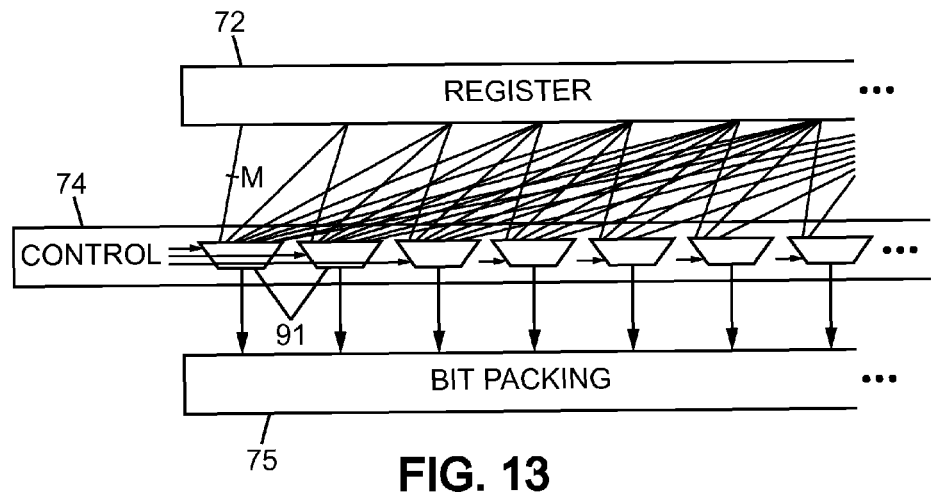
FIG. 13 is a block diagram of exemplary logic usable to implement the coding scheme illustrated by FIG. 12.

The algorithm explained above with reference to FIG. 12 can be implemented with hardware logic as shown in FIG. 13.

In this embodiment, the register 72 receives the bit layers of the coefficients forming the Q groups 64 of a block 62 which are subjected to the mantissa quantization scheme. The register 72 has a capacity of Q×[1+jmax]×M, where M is the number of coefficients per group (4 in the example). The register 72 is shown as a linear register in FIG. 13 (though it can also have a 2D array structure similar to that of FIG. 10) and it takes the bit layers in order of decreasing significance ($L_{jmax}$, $L_{jmax-1}$, $L_{jmax-2}$, etc.). In each layer, the bits are sorted in accordance with the predefined order, e.g. from left to right in FIG. 10-12. The coding logic 74 comprises a series of K/M multiplexers 91 having M-ary inputs connected to M-ary cells of consecutive bits in register 72. The first multiplexer of the series has Q×[1+jmax] M-ary inputs connected with each of the M-ary cells in register 72. The second multiplexer of the series has Q×[1+jmax]−1 inputs connected with the M-ary cells in register 72 except the first cell. The third multiplexer of the series has Q×[1+jmax]−2 inputs connected with the M-ary cells in register 72 except the first two cells, and so on. The outputs of the multiplexers 91 write coding data bits into an output register which forms part of the bit packing unit 75. The $n^{th}$ multiplexer 91 of the series (n≥1) is controlled by a respective control word derived from the exponents obtained by the exponent computation logic 73 and from the contents of the n first M-ary cells of register 72 so as to provide M coding data bits in accordance with the algorithm explained above with reference to FIG. 12.

Symmetrically, the decoding logic 82 of the decompressor 20 can include K/M demultiplexers connected to M-ary cells of an input register receiving the bits representing the absolute values of the mantissas $m_i$. Each demultiplexer is controlled by control word derived from the exponents provided by the bit unpacking unit 81 and from the contents of the first M-ary cells of the input register. The demultiplexers fill a bit array of the kind shown in FIG. 10, in which zero bits are written at the positions not addressed by the demultiplexers. Approximated values $|\tilde{c}_i|$ of the absolute values of the coefficients are thus recovered to be associated with their respective sign bits $s_i$ and assembled into groups in the group mapping unit 83.

On the decoding side, the dequantization can also be done by replacing each number $\tilde{c}_i = s_i \cdot |\tilde{c}_i|$ representing a coefficient $c_i$ by the central value of its quantization bin. So if $s_i = +1$, $c'_i = 2^e \cdot (|m_i| + \frac{1}{2})$, and if $s_i = -1$, then $c'_i = 2^e \cdot (|m_i| + \frac{1}{2})$. In general, various quantization and dequantization conventions can be used in the present invention.

Figure 14:
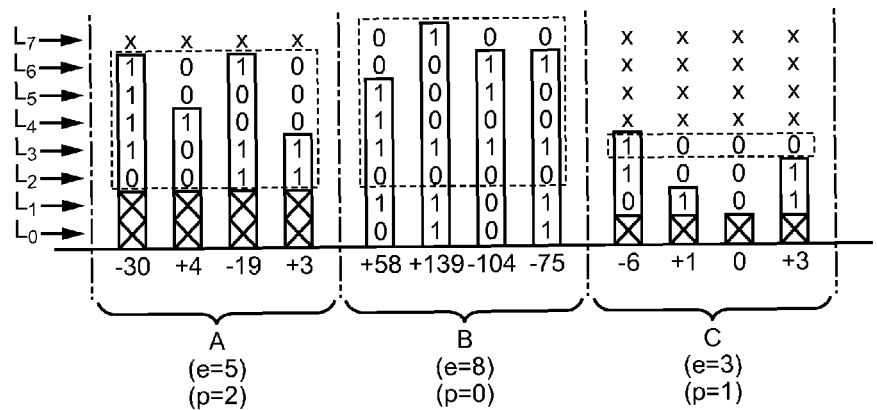
FIG. 14 is a diagram illustrating another way of encoding mantissas from the bit array of FIG. 10 in accordance with an alternative embodiment of the invention.

FIG. 14 illustrates an alternative embodiment in which priority indexes p are respectively assigned to the coefficient groups 64 of a block 62. In this embodiment, the priority index p assigned to a group 64 is considered to be 0 for a low priority group and a positive integer for a higher priority group, the magnitude of the positive integer being a measure of priority level for the group.

Various criteria can be taken into account to assign priority indexes to the coefficient groups 64. A typical example is when the video signal is available according to luma and chroma channels (initially or after a change of color coordinate system). In such context, a higher priority can be assigned to the coefficients groups representing the luma channel, to take into account their usually higher perceptual importance, as compared to the chroma channels. Another possibility is to assign low priority indexes to fine scale coefficients of the multiscale transform and higher priority indexes to coarser scale coefficients.

The example of FIG. 14 uses the same coefficient values as in FIGS. 10-12 and priority indexes of p=2 for group A, p=0 for group B and p=1 for group C. It is seen that the bit columns representing the absolute values of the coefficients are raised by p bit positions in each group having a priority index p. This vertical offset of p bit positions (or a corresponding horizontal offset if a linear layout of the registered is used as discussed with reference to FIG. 13) is applied to read from register 72 of FIG. 7 the bits to be supplied to the multiplexers of the coding logic 74.

In other words, the distribution of the K coding data bits for the absolute values of the mantissas among the coefficient groups, as determined by the control words applied to the multiplexers 91, depends not only on the exponents respectively determined for the coefficient groups 64, but also on the priority indexes assigned to those groups. In particular, the distribution of the K bits among the coefficient groups can be such that the number of bits representing the mantissas determined for one of the coefficient groups in the coding data is an increasing function of the sum of the exponent determined for said one of the coefficient groups and the priority index assigned to said one of the coefficient groups. For controlling the coding logic 74 (and, symmetrically, the decoding logic 82 of the decompressor 20), each exponent e for a group is then replaced by e+p where p is the priority index assigned to that group, or by $\min\{e+p; 1+j_{max}\}$.

By way of example, the compression process uses an N-scale wavelet transform performed "in-place" with an integer lifting scheme. The coefficient image is split into blocks of $2^N \times 2^N$ coefficients each having the same structure. The coefficients inside a block are denoted c[i, j] where $0 \leq i < 2^N$ and $0 \leq j < 2^N$.

Figure 15:
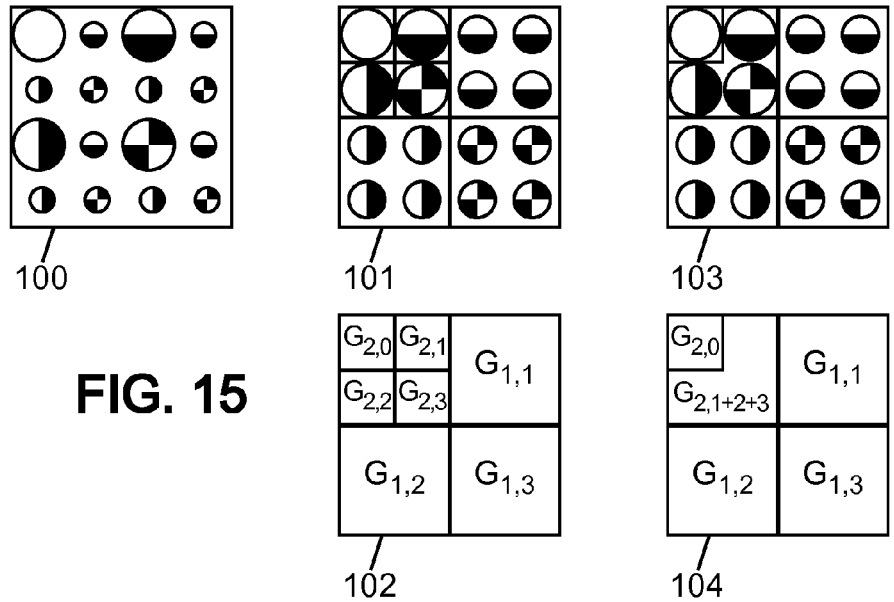
FIG. 15 shows diagrams illustrating the mapping of coefficients of a block onto coefficient groups in a specific example.

Diagram 100 in FIG. 15 illustrates how a block of these coefficients c[i, j] is arranged in the absence of reordering. The coefficients inside each block are then grouped by scale and orientation. In the particular case of the wavelet transform, the groups are the following:

- a group $G_{N,0}$ consisting of one low-pass coefficient c[0, 0] at scale N;
- for each scale n between 1 and N, a group $G_{n,1}$ of horizontal wavelet coefficients $c[2^n \cdot i + 2^{n-1}, 2^n \cdot j]$, having $p=2^{2(N-n)}$ coefficients;
- for each scale n between 1 and N, a group $G_{n,2}$ of vertical wavelet coefficients $c[2^n \cdot i, 2^n \cdot j + 2^{n-1}]$, having $p=2^{2(N-n)}$ coefficients;
- for each scale n between 1 and N, a group $G_{n,3}$ of diagonal wavelet coefficients $c[2^n \cdot i + 2^{n-1}, 2^n \cdot j + 2^{n-1}]$, having $p=2^{2(N-n)}$ coefficients.

The corresponding groups of coefficients are displayed in diagram 101 of FIG. 15, and the names of the groups are written in diagram 102.

As illustrated in FIG. 15 for N=2, the groups are advantageously reorganized to have more homogeneous sizes. For example, groups $G_{N,1}$, $G_{N,2}$ and $G_{N,3}$ all have a single coefficient, and are reorganized as one group $G_{N,1+2+3} = G_{N,1} \cup G_{N,2} \cup G_{N,3}$. Conversely, groups $G_{n,k}$ for smaller n can have numerous coefficients, and can be split into smaller groups of, for example, 2×2 or 4×4 coefficients. Diagrams 103 and 104 in FIG. 15 show how the coefficients are grouped in the case where N=2, i.e. groups $G_{2,1}$, $G_{2,2}$ and $G_{2,3}$ are grouped together into $G_{21+2+3} = G_{2,1} \cup G_{2,2} \cup G_{2,3}$.

In this example, the low-pass components ($G_{2,0}$) for the three color channels can form the coefficient group 63 referred to in FIG. 7, and the groups $G_{2,1+2+3}$, $G_{1,1}$, $G_{1,2}$ and $G_{1,3}$ for the three color channels are Q=12 coefficient groups 64 supplied to the coding data generator 72-75 of FIG. 8.

It is noted that each group $G_{1,1}$, $G_{1,2}$, $G_{1,3}$ is made of M=4 coefficients in this case, while the groups $G_{2,1+2+3}$ have only three coefficients. This difference can be addressed by adapting the coding logic described above with reference to FIGS. 7 and 13. Another possibility is to keep the same regular logic architecture and to take advantage of the priority index feature by distributing the representative bits of the three coefficients to form four modified, artificial coefficients, as illustrated by FIG. 16 where jmax=7.

Figure 16:
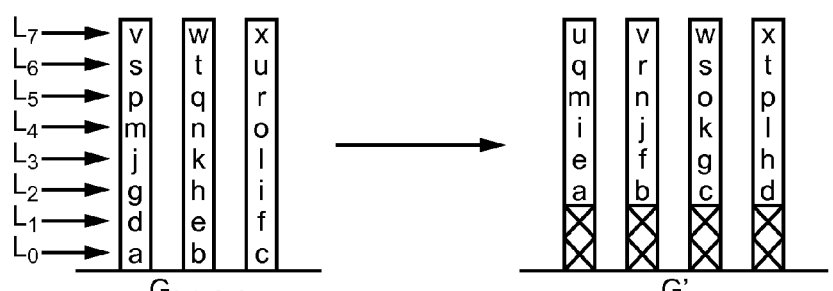
FIG. 16 is a diagram illustrating a bit permutation applicable in an embodiment for encoding certain mantissas.

In FIG. 16, the three coefficients of a group $G_{2,1+2+3}$ have binary representations 'vspmjgda', 'wtqnkheb' and 'xurolifc', where each letter is 0 or 1 and 'a', 'b' and 'c' denote the least significant bits (weight $2^0=1$). Those bits are permuted and redistributed into four columns representing a group G' of four modified coefficients 4×'uqmiea', 4×'vrnjfb', 4×'wsokgc' and 4 ×'xtplhd'. By adding 2 to the priority index assigned to that group G', we can account for the reduction of the number of bits per coefficient resulting from the permutation to properly encode the significant bits of the three original coefficients if the bit budget permits. The permutation of the bits in FIG. 16 preserves their order of significance. The inverse permutation is applied in the decoding logic 82 of the decompressor 20 to rebuild the relevant coefficients.

Figure 17:
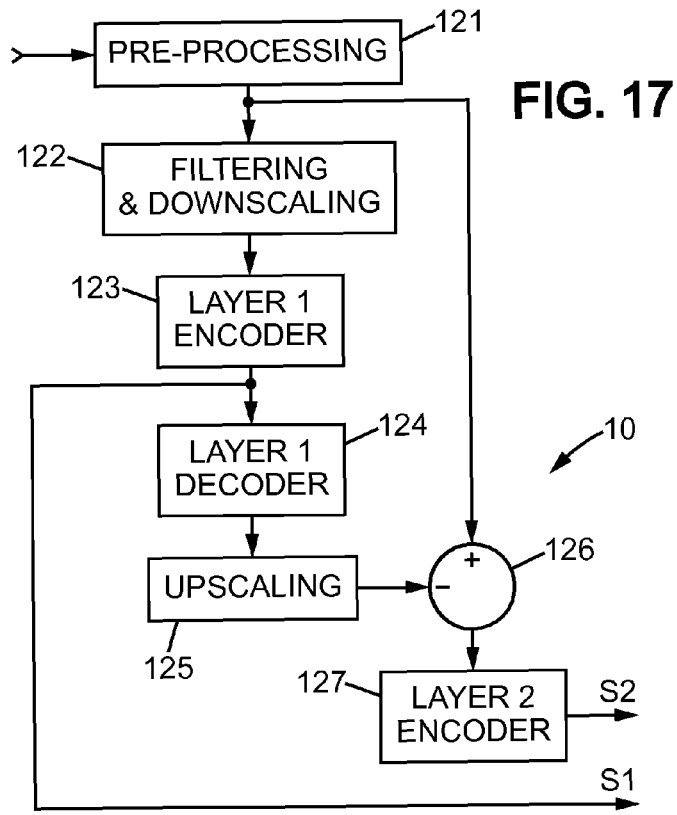
FIGS. 17 and 18 are block diagrams of exemplary encoder and decoder according to another embodiment of the invention.

An alternative embodiment of the encoder 10, having a two-layer structure, is depicted in FIG. 17. In this example, the input video signal is first pre-processed in a module 121. The pre-processing module 121 can perform operations such as a conversion of the input video signal into a new component space and a range adjustment. Component space conversion may be useful to group information in a manner better appropriate to subsequent processing. For instance RGB pixels are converted to YUV. The range adjustment is such that extremum values are no longer present in the components. For example, an input value represented by a 10-bit unsigned number in the range 0 to 1023 may be converted to an 11-bit number in the range 85 to 1963. Eliminating extreme values gives some protection from clamping-related artifacts in the quantized output after processing. Like in the preceding embodiment, the compression is block based. Typical block sizes include 4×4, 8×8, 4×8, 2×8. The block size 4×4 is assumed for the subsequent discussion.

The pre-processed pixels are filtered with a two-dimensional linear finite impulse response (FIR) filter and sub-sampled in a filtering and downscaling module 122 to produce a base stream. The filter can be restricted to the current block. No context outside the current block is then required. Advantageously though, the filter uses a support that extends into neighboring blocks. In this case, the filter offers protection against aliasing. In an illustrative example, the Y component is filtered with a separable square 2D filter whose coefficients are [1 3 3 1]×[1 3 3 1] and sub-sampled on a 2×2 grid centered on [2j . . . 2j+1]×[2k . . . 2k+1] patches (j, k integer), and the U and V components are filtered by a 2D filter whose coefficients are [1 3 4 4 3 1]×[1 3 4 4 3 1] and sub-sampled on a 4×4 grid centered on [4j . . . 4j+3]×[4k . . . 4k+3] patches (j, k integer).

The information in the base stream corresponding to each block is stored or transmitted as a base packet. The transformation to base packets may involve recoding and quantization by a layer 1 encoder 123 or may be direct (i.e. encoder 123 is not there). In a possible implementation, the encoder 123 is as described in WO 2009/053780. Another possibility for the layer 1 encoder 123 is to make it in accordance with FIG. 8 as described above.

Still within the two-layer encoder 10, the quantized base stream S1 is decoded by a local layer 1 decoder 124 which applies the inverse transformations corresponding to the layer 1 encoder 123. The decoder 124 thus produces a video stream which is the base stream plus any quantization effects due to the layer 1 encoding if it is lossy. The exact base stream which will be used in the decoder 20 is thus available in the encoder 10.

The pre-processed input stream (from module 121) and the quantized base stream, oversampled in an upscaling module 125 to match the spatial resolution of the pre-processed input stream, are subtracted from each other by the subtractor 126 to yield a refinement stream which is an artificial video stream formed of successive frames. The refinement stream is fed to a layer 2 encoder 127. The layer 2 encoder 127 is preferably of the kind described with reference to FIG. 8 above, though other encoder structures can also be considered.

The output of the two-layer encoder 10, written to the frame buffer 4, is made of the combined outputs S1, S2 of the two component encoders 123, 127 (or the base stream output by module 122 combined with the output S2 of the layer 2 encoder 127 if there is no layer 1 encoder).

Figure 18:
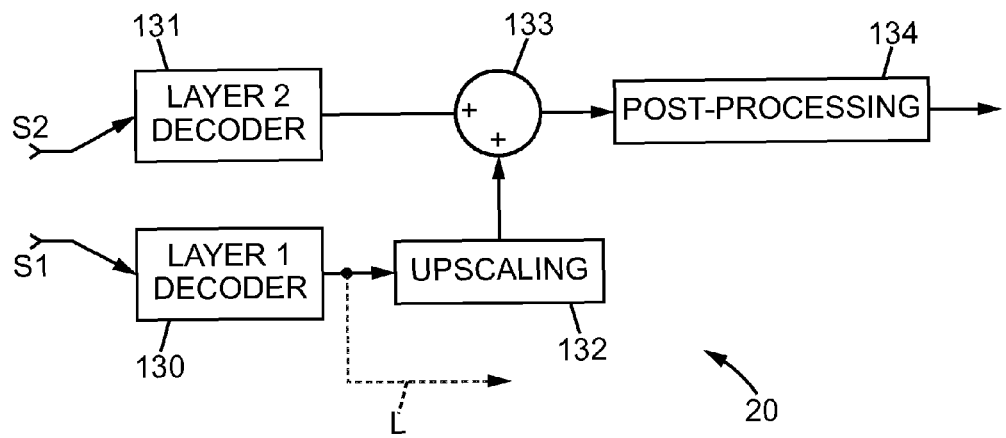

FIG. 18 shows a two-layer decoder 20 suitable for decoding a video stream encoded with the encoder of FIG. 17. The quantized base stream S1 received from the frame buffer 4 is decoded by a layer 1 decoder 130 identical to that 124 present in the encoder. If only a low-definition version of the input video signal is needed by the downstream processing, the decoded base stream L output by the layer 1 decoder 130 is supplied.

If a full-definition version is required, the quantized refinement stream S2 is also used. For that, a layer 2 decoder 131, which may be in accordance with FIG. 9 if the layer 2 encoder 127 is in accordance with FIG. 8, receives the quantized refinement stream S2 to produce a decoded refinement stream. The pixelwise sum of the decoded refinement stream and of the decoded base stream, oversampled in an upscaling module 132 to match the spatial resolution of the refinement stream, is computed by an adder 133 which outputs a replica of the pre-processed input stream on the encoder side. The full-definition version of the input video signal is finally obtained by a post-processing module 134 which applies the inverse transformations of the transformations applied by the pre-processing module 120 of the encoder. Part or all of the post-processing module 134 may also be located downstream of the video processor 6 (FIGS. 2-3).

The above compression schemes have applications for reducing the volume of data to be stored in external frame stores, thus reducing (1) the size requirement of the external DRAM chips(s) 4 and (2) the bandwidth requirement to this external DRAM storage. For example, the encoder 10 and decoder 20 can be incorporated in a video processing device 8 having the architecture depicted in FIG. 2, with a decompressed line buffer 15 containing a stripe of decompressed pixels accessed by the video processor 6.

Furthermore, the volume of data to be stored in internal line buffers can also be reduced, thus reducing the requirement on the size and silicon surface of the internal line buffer. In this case, the video processing device 8 may have the architecture depicted in FIG. 3, with a compressed line buffer 25 containing coding data for a stripe of pixels and a small-sized decompressed context buffer 35 fed by the decoder 20 and read by the video processor 6.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A method of compressing a video signal, comprising:
   applying a local multiscale transform to a frame of the video signal to obtain coefficient blocks;
   distributing the coefficients of each block into coefficient groups associated with said block;
   processing a plurality of the coefficient groups associated with a block, wherein the processing of one of the groups comprises determining an exponent for encoding the coefficients of said one of the groups, and wherein the processing of the plurality of coefficient groups comprises determining mantissas for quantizing the coefficients of each group in the plurality of groups in combination with the exponents respectively determined for said groups; and
   storing coding data including each exponent determined for a coefficient group and the mantissas quantizing the coefficients of said group in combination with said exponent,
   wherein the mantissas determined for quantizing the coefficients of one of the groups are represented in the coding data by a respective number of bits depending on the exponents respectively determined for said plurality of coefficient groups.

2. The method as claimed in claim 1, wherein each coefficient group is made up of coefficients resulting from the local multiscale transform at a same scale.

3. The method as claimed in claim 1, comprising:
   allocating a preset number of coding data bits to all the mantissas determined for said plurality of coefficient groups; and
   distributing the preset number of coding data bits among the coefficient groups as a function of the exponents respectively determined for said coefficient groups.

4. The method as claimed in claim 3, wherein the distribution of the preset number of coding data bits among the coefficient groups is such that the number of bits representing the mantissas determined for quantizing the coefficients of one of the groups in the coding data is an increasing function of the exponent determined for said one of the groups.

5. The method as claimed in claim 1, wherein respective priority indexes are respectively assigned to the plurality of coefficient groups associated with a coefficient block, and wherein the mantissas determined for quantizing the coefficients of one of the groups are represented in the coding data by a respective number of bits depending on the exponents determined for the plurality of coefficient groups and on the priority indexes assigned to the plurality of coefficient groups.

6. The method as claimed in claim 5, comprising:
   allocating a preset number of coding data bits to all the mantissas determined for said plurality of coefficient groups; and
   distributing said preset number of coding data bits among the coefficient groups as a function of the exponents respectively determined for said groups and of the priority indexes respectively assigned to said groups.

7. The method as claimed in claim 6, wherein the priority index is zero for at least one first coefficient group and a positive integer for at least one second coefficient group, and wherein the distribution of the preset number of coding data bits among the coefficient groups is such that the number of bits representing the mantissas determined for quantizing the coefficients of one of the coefficient groups in the coding data is an increasing function of the sum of the exponent determined for said one of the coefficient groups and the priority index assigned to said one of the coefficient groups.

8. The method as claimed in claim 5, wherein said plurality of coefficient groups include first groups having the same number of coefficients and at least one second group having fewer coefficients than said first groups, the method comprising:

rearranging the coefficients of said second group by a bit permutation into a rearranged group of M modified coefficients, where M is the number of coefficients in said first groups;

increasing the priority index of the rearranged group as compared to said second group to account for a reduction of the number of bits per coefficient resulting from the permutation.

9. An encoder for compressing a video signal, comprising:
a transforming unit for applying a local multiscale transform to a frame of the video signal to obtain coefficient blocks;
a mapping unit for distributing the coefficients of each block into coefficient groups associated with said block; and
a coding data generator for generating coding data from a plurality of the coefficient groups associated with a block, wherein the coding data include, for one of the groups:
an exponent for encoding the coefficients of said one of the groups; and
mantissas for quantizing the coefficients of said one of the groups in combination with the exponent determined for said one of the groups,
wherein the mantissas determined for one of the groups are represented in the coding data by a respective number of bits depending on the exponents determined for said plurality of coefficient groups.

10. The encoder as claimed in claim 9, wherein respective priority indexes are respectively assigned to the plurality of coefficient groups associated with a coefficient block, and wherein the mantissas determined for one of the groups are represented in the coding data by a respective number of bits depending on the exponents determined for the plurality of coefficient groups and on the priority indexes assigned to the plurality of coefficient groups.

11. A method of decompressing a video signal from coding data, wherein, for a frame of the video signal, the coding data include block data for respective coefficient blocks corresponding to respective regions of the frame in a local multiscale transform, wherein each block comprises a plurality of coefficient groups, wherein the block data for each coefficient block include exponents respectively associated with at least some of the coefficient groups of said block and mantissas associated with the coefficients of each group of said at least some of the coefficient groups, the method comprising, for at least one coefficient block:

reading in the block data the exponents associated with said coefficient groups;
obtaining from the block data the mantissas associated with the coefficients of said coefficient groups in accordance with a distribution of coding data bits determined as a function of the read exponents;
recovering approximated values of the coefficients of each of said coefficient groups by combining the mantissas associated with said coefficients and the exponent associated with said coefficient group;
assembling said coefficient block using the approximated coefficient values; and
applying a local inverse multiscale transform to the assembled coefficient block.

12. The method as claimed claim 11, wherein the distribution of coding data bits in the block data is determined as a function of the read exponents and of priority indexes assigned to said coefficient groups.

13. A decoder for decompressing a video signal from coding data, wherein, for a frame of the video signal, the coding data include block data for respective coefficient blocks corresponding to respective regions of the frame in a local multiscale transform, wherein each block comprises a plurality of coefficient groups, wherein the block data for each coefficient block include exponents respectively associated with at least some of the coefficient groups of said block and mantissas associated with the coefficients of said at least some of the coefficient groups, the decoder comprising:

an extraction unit for obtaining block data for at least one coefficient block, the block data including the exponents associated with said coefficient groups and the mantissas associated with the coefficients of each group of said coefficient groups, the mantissas being obtained in accordance with a distribution of coding data bits determined as a function of the exponents associated with said coefficient groups;
decoding logic for obtaining approximated values of the coefficients of each of said coefficient groups by combining the mantissas associated with said coefficients and the exponent associated with said coefficient group;
an assembling unit for assembling said coefficient block using the approximated coefficient values; and
a transforming unit for applying a local inverse multiscale transform to the assembled coefficient block.

14. The decoder as claimed claim 13, wherein the distribution of coding data bits in the block data is determined as a function of the exponents and of priority indexes assigned to said coefficient groups.

15. A video processing device, comprising:
an encoder for compressing a video signal in the form of coding data for successive frames of the video signal;
a memory interface for storing the coding data in an external memory and retrieving coding data from the external memory;
a decoder for converting retrieved coding data into a decompressed signal; and
a video processor for processing the decompressed signal, wherein the encoder comprises:
a transforming unit for applying a local multiscale transform to a frame of the video signal to obtain coefficient blocks;
a mapping unit for distributing the coefficients of each block into coefficient groups associated with said block; and
a coding data generator for generating coding data from a plurality of the coefficient groups associated with a block, wherein the coding data include, for one of the groups:
an exponent for encoding the coefficients of said one of the groups; and
mantissas for quantizing the coefficients of said one of the groups in combination with the exponent determined for said one of the groups, wherein the mantissas determined for one of the groups are represented in the coding data by a respective number of bits depending on the exponents determined for said plurality of coefficient groups,
and wherein the decoder comprises:
an extraction unit for obtaining block data for at least one coefficient block, the block data including the exponents associated with said coefficient groups and the mantissas associated with the coefficients of said coefficient groups, the mantissas being obtained in accordance with a distribution of coding data bits determined as a function of the exponents associated with said coefficient groups;
decoding logic for obtaining approximated values of the coefficients of each of said coefficient groups by combining the mantissas associated with said coefficients and the exponent associated with said coefficient group;
an assembling unit for assembling said coefficient block using the approximated coefficient values; and
a transforming unit for applying a local inverse multiscale transform to the assembled coefficient block.

* * * * *